United States Patent
Duquene et al.

(10) Patent No.: US 9,967,358 B2
(45) Date of Patent: May 8, 2018

(54) COLLABORATIVE BASED CACHING

(71) Applicant: International Business Machines Corporation, Armonk, NY (US)

(72) Inventors: Joel Duquene, Raleigh, NC (US); Morris S. Johnson, Jr., Cary, NC (US); Henri F. Meli, Morrisville, NC (US); Adrienne Y. Miller, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 14/669,129

(22) Filed: Mar. 26, 2015

(65) Prior Publication Data

US 2016/0285991 A1    Sep. 29, 2016

(51) Int. Cl.
*H04L 29/08* (2006.01)
*G06F 17/30* (2006.01)
(Continued)

(52) U.S. Cl.
CPC ...... *H04L 67/2842* (2013.01); *G06F 11/3495* (2013.01); *G06F 12/0813* (2013.01);
(Continued)

(58) Field of Classification Search
CPC ............... H04L 67/2842; H04L 67/142; H04L 65/1083; H04L 67/06; H04L 67/1097;
(Continued)

(56) References Cited

U.S. PATENT DOCUMENTS 8,312,146 B2   11/2012   Jawahar et al.
8,370,850 B2 * 2/2013   Nochimowski ..... G06F 12/0246
                                                       711/123
(Continued)

FOREIGN PATENT DOCUMENTS

EP          2464083 A1      6/2012
WO    2007123785 A2    11/2007
WO    2009020973 A1      2/2009

OTHER PUBLICATIONS

U.S. Appl. No. 15/153,136, filed May 12, 2016, Entitled "Collaborative Based Caching".
(Continued)

*Primary Examiner* — Patrice L Winder
(74) *Attorney, Agent, or Firm* — Tihon Poltavets

(57) ABSTRACT

A computer-implemented method for collaborative caching of files during a collaboration session includes receiving a request from a first electronic device for a first file. The method determines whether the first file is stored in one or more caches, wherein the one or more caches are associated with one or more electronic devices. Responsive to determining the first file is stored in a cache of a second electronic device, the method determines whether the first file stored in the cache of the second electronic device meets a set of guidelines. Responsive to determining the first file stored in the cache of the second electronic device meets the set of guidelines, the method sends the first file from the cache of the second electronic device via an internal network to the first electronic device.

12 Claims, 3 Drawing Sheets

(51) Int. Cl.
*G06F 11/34* (2006.01)
*G06F 12/0813* (2016.01)
*H04L 29/06* (2006.01)

(52) U.S. Cl.
CPC .... *G06F 17/3087* (2013.01); *G06F 17/30165* (2013.01); *H04L 65/1083* (2013.01); *H04L 67/06* (2013.01); *H04L 67/1097* (2013.01); *H04L 67/142* (2013.01); *G06F 11/349* (2013.01); *G06F 11/3419* (2013.01); *G06F 2212/154* (2013.01); *G06F 2212/314* (2013.01)

(58) Field of Classification Search
CPC ........... G06F 17/30165; G06F 12/0813; G06F 11/3495; G06F 17/3087; G06F 2212/154; G06F 2212/314; G06F 11/349; G06F 11/3419

See application file for complete search history.

(56) References Cited

U.S. PATENT DOCUMENTS

| | | | |
|---|---|---|---|
| 8,676,913 B1* | 3/2014 | Roche | H04L 51/32 709/206 |
| 9,210,236 B2 | 12/2015 | Lowery et al. | |
| 9,372,778 B1 | 6/2016 | Duquene et al. | |
| 9,384,199 B2* | 7/2016 | Thereska | H04L 63/205 |
| 9,525,751 B2 | 12/2016 | Duquene et al. | |
| 9,654,532 B2* | 5/2017 | Strigeus | H04L 65/60 |
| 2003/0005228 A1* | 1/2003 | Wong | G06F 12/084 711/121 |
| 2008/0109543 A1* | 5/2008 | Abanami | G06Q 10/06 709/223 |
| 2010/0115613 A1* | 5/2010 | Ramaswami | G06F 17/30902 726/22 |
| 2010/0198888 A1* | 8/2010 | Blomstedt | G06F 17/30017 707/827 |
| 2010/0235581 A1* | 9/2010 | Anderson | G06F 12/0813 711/130 |
| 2010/0312861 A1 | 12/2010 | Kolhi et al. | |
| 2012/0084346 A1 | 4/2012 | Mickens | |
| 2013/0018868 A1 | 1/2013 | Chi et al. | |
| 2014/0280955 A1* | 9/2014 | Stuntebeck | H04L 63/107 709/226 |
| 2016/0359952 A1 | 12/2016 | Duquene et al. | |

OTHER PUBLICATIONS

Appendix P.: List of IBM Patents or Patent Applications Treated as Related, Dated May 17, 2016, 2 pages.

U.S. Appl. No. 15/010,570, filed Jan. 29, 2016, Entitled "Collaborative Based Caching".

Appendix P.: List of IBM Patents or Patent Applications Treated as Related, Dated Feb. 2, 2016, 2 pages.

IBM, "Appendix P—List of IBM Patents or Patent Applications Treated as Related", 2 pages, dated May 15, 2017.

* cited by examiner

COLLABORATIVE BASED CACHING

BACKGROUND

The present invention relates generally to collaboration sessions and more particularly to collaborative caching of files during a collaboration session.

Typical collaborative sessions, such as teleconferences, include multiple participants, where each participant may be located in various locations. The collaborative sessions can include the multiple participants utilizing links to dashboards, wiki pages, and file documents. In instances where screen sharing is not utilized by a participant leading a collaboration session, the leading participant moves the agenda of the collaboration session and the progression is predictable since the leading participant is first to progress. As a result, the other participants follow the progression of the leading participant and select links or attempt to access the files the leading participant has already selected. As the other participants select links or attempt to access the files, requests from the other participants are sent to the server and the server responds to each of the requests.

SUMMARY

Embodiments of the present invention includes a method, computer program product and computer system for collaborative caching of files during a collaboration session. A computer-implemented method includes receiving a request from a first electronic device for a first file. The method determines whether the first file is stored in one or more caches, wherein the one or more caches are associated with one or more electronic devices. Responsive to determining the first file is stored in a cache of a second electronic device, the method determines whether the first file stored in the cache of the second electronic device meets a set of guidelines. Responsive to determining the first file stored in the cache of the second electronic device meets the set of guidelines, the method sends the first file from the cache of the second electronic device via an internal network to the first electronic device.

DETAILED DESCRIPTION

Embodiments in accordance with the present invention allow for participants of a collaboration session to share resources over an internal network, where resources can include video or document files. The sharing of these resources can occur during a collaboration session between the participants of the collaboration session. Embodiments in accordance with the present invention can manage the shared resources to prevent duplication and to anticipate resource selection by the participants of the collaboration session. For example, if a host participant of a collaboration session selects resources to view, embodiments in accordance with the present invention can determine that the other participants are to select the same resources selected by the host participant. Storing the resource from the initial request by the host participant in a local cache enables the local cache to satisfy subsequent requests for the resource through an internal network rather than through an external network.

Figure 1:
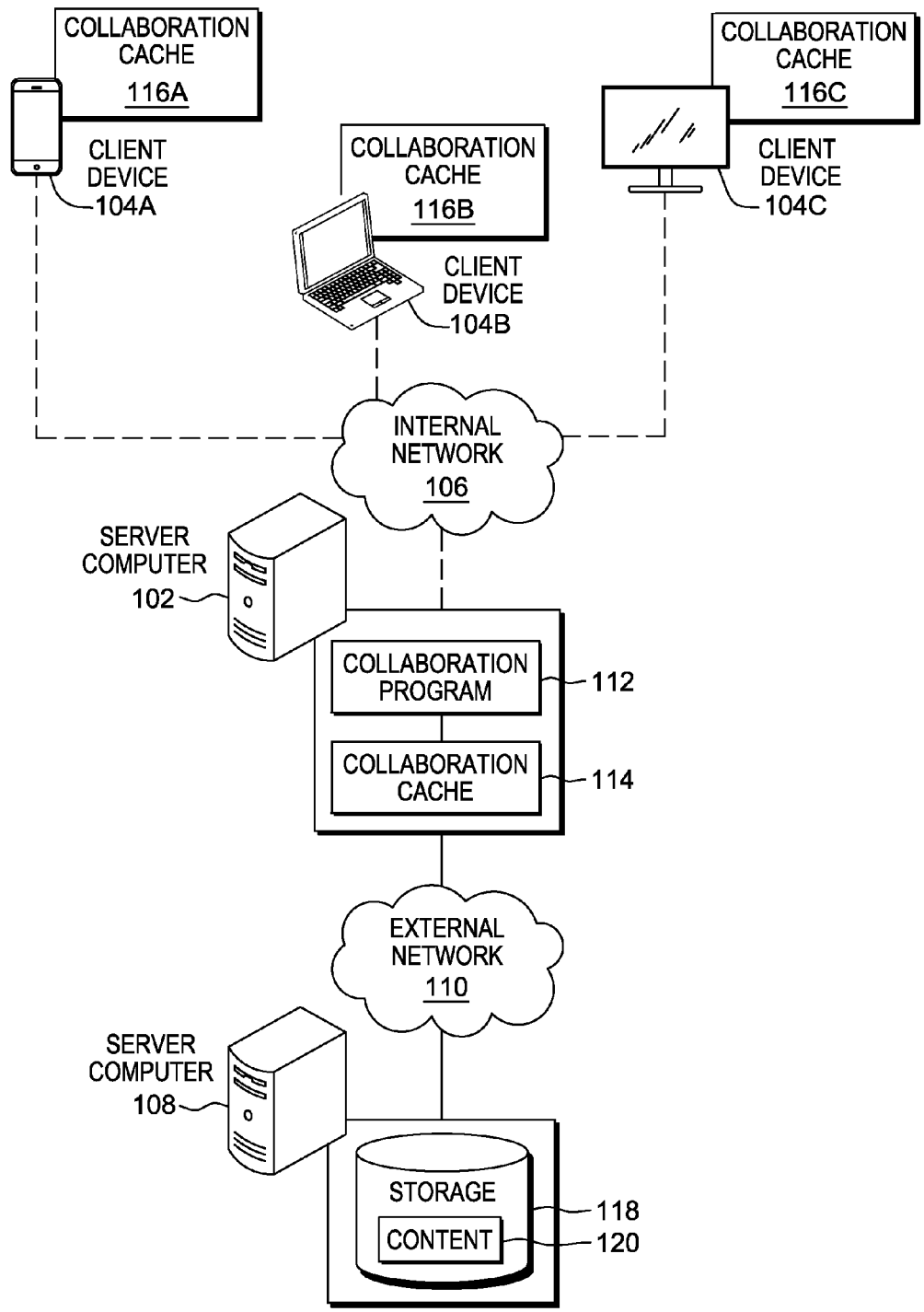
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment. The distributed data processing environment includes server computer 102, client device 104A, client device 104B, and client device 104C interconnected over internal network 106. The distributed data processing environment also includes server computer 102 and server computer 108 interconnected over external network 110.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through internal network 106, as is common in data centers and with cloud computing applications. In general, server computer 102 is representative of any programmable electronic device or combination of programmable electronic devices capable of executing machine readable program instructions and communicating with other computer devices via a network. Collaboration cache 114 in server computer 102 represent a temporary storage medium during a collaboration session, where files stored in collaboration cache 114 are accessible by client device 104A, 104B, and 104C via internal network 106.

Collaboration program 112 located on server computer 102 has the ability to manage collaborative caches during a collaboration session. Collaboration program 112 can receive a request for a file from a participant of a collaboration session and determine if the file is located in one or more of collaboration cache 114, 116A, 116B, and 116C. Responsive to collaboration program 112 determining the file exists in one or more collaboration cache 114, 116A, 116B, and 116C, collaboration program 112 determines if the stored file meets guidelines prior to sending the file to the requesting participant. Alternatively, responsive to collaboration program 112 determining the file does not exist in one or more collaboration cache 114, 116A, 116B, and 116C, collaboration program 112 queries server computer 108 for the file stored in content 120. Collaboration program 112 can receive the file from server computer 108, send the file to the requesting participant, and store the file in one or more collaboration caches 114, 116A, 116B, and 116C.

Client device 104A, 104B, and 104C may be a desktop computer, a laptop computer, a tablet computer, a specialized computer server, a smart phone, or any programmable electronic device capable of communicating with server computer 102 via internal network 106, as well as, with server computer 108 via external network 110. In general, client device 104A, 104B, and 104C represent any programmable electronic device or combination of programmable electronic devices capable of executing machine readable program instructions and communicating with other computing devices via a network, such as internal network 106 and external network 110. Client device 104A, 104B, and 106C include collaboration cache 116A, 116B, and 116C, respectively. Collaboration cache 116A, 116B, and 116C represent temporary storage mediums during a collaboration session, where files stored in collaboration cache 116A, 116B, and 116C are accessible by participants of the collaboration session via internal network 106. Collaboration program 112 has the ability to store a file in portions across collaboration cache 114, 116A, 116B, and 116C. For example, collaboration program 112 can store a first portion of a file in collaboration cache 114 and a second portion of the file in collaboration cache 116B.

Server computer 108 may be a desktop computer, a laptop computer, a tablet computer, a specialized computer server, a smartphone, or any other computer system known in the art. In certain embodiments, server computer 108 represents a computer system utilizing clustered computers and components that act as a single pool of seamless resources when accessed through external network 110, as is common in data centers and with cloud computing applications. In general, server computer 108 is representative of any programmable electronic device or combination of programmable electronic devices capable of executing machine readable program instructions and communicating with other computer devices via a network. Server computer 108 represents an external device collaboration program 112 queries for the file requested by a participant of a collaboration session in the event the file is not stored in one or more of cache 114, 116A, 116B, and 116C.

Storage 118 in server computer 108 stores content 120, where content 120 represents the file being requested by a participant of a collaboration session. Similar to server computer 108, storage 118 is accessible through external network 110. Storage 118 can experience latencies when receiving a large quantity of requests for the same file. As a result, collaboration program 112 manages the requests for the file by querying storage 118 for the file to satisfy the initial request, storing the file in one or more cache 114, 116A, 116B, and 116C, and handling the subsequent requests for the file by querying one or more caches 114, 116A, 116B, and 116C via internal network 106. In another embodiment, client device 104A, 104B, and 104C can communicate directly with server computer 108 via another network not illustrated in FIG. 1.

In general, internal network 106 can be any combination of connections and protocols that will support communications among server computer 102 and client device 104A, 104B, and 104C. Internal network 106 can include, for example, a local area network (LAN), a wide area network (WAN), such as the internet, a cellular network, or any combination of the preceding, and can further include wired, wireless, and/or fiber optic connections. In one embodiment, collaboration program 112 can be a web service accessible via internal network 106 to a user of client device 104A, 104B, and 104C. In another embodiment, collaboration program 112 may be operated directly by a user of server computer 102. External network 110 can be any combination of connections and protocols that will support communications among server computer 102 and server computer 108. External network 110 can include, for example, a local area network (LAN), a wide area network (WAN), such as the internet, a cellular network, or any combination of the preceding, and can further include wired, wireless, and/or fiber optic connections.

Figure 2:
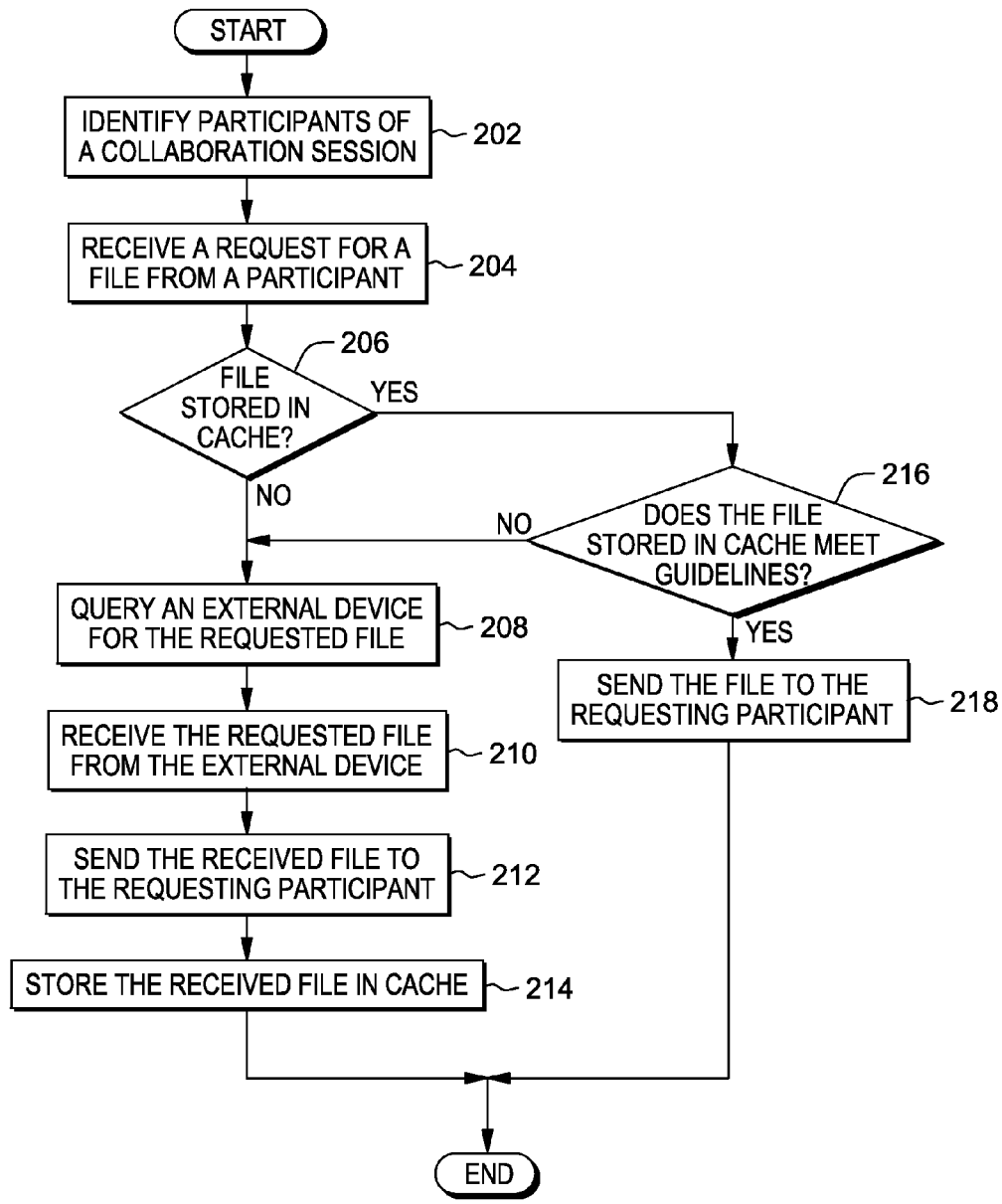
FIG. 2 is a flowchart depicting one embodiment of a collaboration program for collaborative caching of files during a collaboration session, in accordance with the present invention.

FIG. 2 is a flowchart depicting one embodiment of a collaboration program for collaborative caching of files during a collaboration session, in accordance with the present invention. As depicted, the method includes identifying (202) participants of a collaboration session, receiving (204) a request for a file, determining (206) whether the file is stored in cache, querying (208) an external device for the requested file, receiving (210) the requested file, sending (212) the received file to the requesting participant, storing (214) the received file in cache, determining (216) whether the file stored in cache meets guidelines, and sending (218) the file to the request participant. In one embodiment, the method is conducted by collaboration program 112.

The method may commence by identifying (202) participants of a collaboration session. In this embodiment, a collaboration session in form of a teleconference is occurring, where participants of the collaboration session are connected to a local network. The collaboration session is initialized when a host participant joins the collaboration session (i.e., connects to the teleconference) and the collaboration session terminates when the host participant leaves the collaboration sessions (i.e., disconnects from the teleconference). Collaboration program 112 can identify participants through individual calendars associated with each participant or unique call-in access codes for the teleconference. In one example, the host participant has the ability to utilize collaboration program 112 to query an external device (i.e., server computer 108) for one or more files which are to be utilized during the meeting when the host participant joins the teleconference. As a result, any known files needed for the meeting are stored in a local centralized storage (i.e., collaboration cache 114, 116A, 116B, and cache 116C) and accessible through internal network 106 by client device 104A, 104B, and 104C.

Through the local network, a participant has access to a centralized cache on a local server (such as server computer 102) and a collaboration cache on each client device taking part in the collaboration session. In one example, a participant may be linked to a specific collaboration session based on whether or not the participant received and approved an invitation to take part in the collaboration session. In this embodiment, a particular participant has access to another participant's collaboration cache only during the duration that the data is stored in the collaboration cache. In another embodiment, a particular participant has access to another participant's collaboration cache if the select participant previously received approval to access the other participant's cache.

The method may continue by receiving (204) a request for a file from a participant. In this embodiment, collaboration program 112 receives a request for a video file from a participant taking part in the participation sessions. Collaboration program 112 can log the request for the video file and determine if the video file has been requested by another participant of the collaboration session. Additionally, collaboration program 112 can track the progress of each request for the video file by other participants. As a result, collaboration program 112 can determine whether the video file is in the process of being downloaded by another participant and whether the video file has already been downloaded by another participant. Collaboration program 112 maintains the log of requests and tracks the progress of each request until the collaboration session is terminated when the host participant leaves the collaboration session. In another embodiment, collaboration program 112 maintains the log of request and tracks the progress of each request until the final participant leaves the collaboration session.

The method may continue by determining (206) whether the file is stored in cache. In this embodiment, collaboration program 112 determines if the file is stored in a collaboration cache located on a local server (such as server computer 102), where the local server is accessible by participants of the collaboration session. Additionally, collaboration program 112 determines if the file is stored in collaboration caches of client devices associated with the participants of the collaboration sessions. Due to collaboration program 112 tracking the progress of download requests for each participant, collaboration program 112 can utilize a threshold for determining whether to wait until a download of the requested file is complete for another participant or initialize a new download for the requesting participate. In an example, a first participant of a collaboration session utilizes a mobile phone device to download a file while traveling to the office on a subway, where the external connection is periodically cutting out. A second participant of the collaboration session utilizes a laptop computer device to initialize a download of the file during the time that the first participant is downloading the same file. Collaboration program 112 has the ability to determine, based on the download rate, to download the file to the second participant rather than wait for the file to be available in a collaboration cache of the first participant.

In the event the file is not stored in cache ("no" branch, 206), the method may query (208) an external device for the requested file. In the event the file is stored in cache ("yes" branch, 206), the method may determine (216) if the file stored in cache meets guidelines.

The method may continue by querying (208) an external device for the requested file. In this embodiment, collaboration program 112 queries an external device via an external network (i.e., external network 110) to obtain the file requested by the participant of the collaboration session. In one example, the external device is a storage system (i.e., storage 118) located in a server computer 108 accessible by collaboration program 112. In second example, the external device is a storage system located in a server computer accessible by the requesting participant, where the requesting participant has access to the server computer through an external network, such as, a data connection by cellular service provider. As previously mentioned, collaboration program 112 has the ability to query the external device for one or more files when a host participant joins a meeting. Collaboration program 112 can query the external device for the one or more files once the host participant joins the meetings rather than as a result of received requests from other participants which may be for the one or more files.

The method may continue by receiving (210) the requested file from the external device. In this embodiment, collaboration program 112 receives the requested file from server computer 108 via external network 110. Collaboration program 112 can monitor a download rate for receiving the requested file from the external device (i.e., server computer 108) and depending on the download rate, collaboration program 112 can determine whether to wait for completion of the download prior to executing the subsequent step or take another course of action. For example, collaboration program 112 can determine latencies in the download rates of the requested files via external network 110 and can instruct the client device of the requesting participant to initialize the download via an external network independent of external network 110. Collaboration program 112 can also utilize a portion of file received threshold, where the portion of file received threshold is a percentage of the file received from the external device. For example, collaboration program 112 utilizes a portion of file received threshold of 80%, where once 80% of the file is received, collaboration program 112 can initialize the sending of the received file to the requesting participant.

The method may continue by sending (212) the received file to the requesting participant. In this embodiment, collaboration program 112 sends the received file to the requesting participant once the file is completely received from the external device (i.e., server computer 108). In another embodiment, collaboration program 112 sends the received file to the requesting participant once a portion of file received threshold is met and as a result, collaboration program 112 can begin sending the received file to the requesting participant prior to completely receiving the requested file. Collaboration program 112 also has the ability to send the received file to all participants of the collaboration session in anticipation of receiving a request for the same file. For example, if a host participant of a collaboration session is requesting a particular file not stored in collaboration cache 114, 116A, 116B, and 116C, collaboration program 112 determines the other participants of the collaboration session are to follow suit and sends the received file to all the participants of the collaboration session. In this example, client device 104A, 104B, and 104C can receive the file requested by the host participant but not display the file. However, the client device of the requesting host participant (i.e. the device that requested the file) displays the requested file.

The method may continue by storing (214) the received file in the cache. In this embodiment, collaboration program 112 stores the received file in a centralized collaboration cache (e.g., collaboration cache 114) and can instruct the client device of the requesting participant to store the received file in an associated collaboration cache as well (e.g., collaboration cache 116A). Storing the received file in multiple caches enables an alternative source for the file in the event the centralized collaboration cache becomes unavailable during the collaboration session. For example, collaboration program 112 can store a first portion of a received file in collaborative cache 116A in client device 104A and second portion of the received file in collaborative cache 116B.

Collaboration program 112 can store the received file for the duration of the collaboration session and subsequent to the completion of the collaboration session, collaboration program 112 deletes the received file from the collaboration cache. Alternatively, collaboration program 112 can utilize a user defined duration for storing the received file. For example, collaboration program 112 can store the received file in the centralized collaboration cache for 5 minutes and subsequent to 5 minutes elapsing, collaboration program 112 can re-query the external device for the received file. Utilizing the user defined duration for storing the received file ensures that the file is the latest version.

The method may continue by determining (216) whether the file stored in cache meets guidelines. A first example of a guideline includes a duration for which the file has been stored in the cache. Every participant of a collaboration session can have a particular user defined duration for storing a received file, where, for example, a duration defined by a first participant is different from a duration defined by a second participant. For example, a file is being stored in collaboration cache 116A of a first participant's client device 104A for a duration of 5 minutes and currently the file has already been stored for 4 minutes. A second participant with client device 104B is requesting the file being stored in collaboration cache 116A and includes a user defined duration of 3 minutes for storing received files. As a result, collaboration program 112 determines the file being stored in collaboration cache 116A does not meet the guideline defined by the second participant with client device 104B. However, if the file being stored in collaboration cache 116A has only been stored for 1 minute, collaboration program 112 determines the file meets the guideline defined by the second participant with client device 104B.

A second example of a guideline includes a type of device with a collaboration cache which stores the file. Every participant of a collaboration session can have a particular user defined list of approved device types from which a file can be received. The user defined list of approved device types enables the participant to, for example, avoid any additional formatting when transferring files between two different types of devices, such as a mobile device utilizing a first operating system and a laptop computer utilizing a second operating system. For example, a first participant of a collaboration session stores the file in collaboration cache 116A of client device 104A, where client device 104A is a mobile device. A second participant which sent the request for the file has a user defined list of approved device types that includes laptop computers and desktop computers. Collaboration program 112 determines the file does not meet the guideline since the file is being stored on a device not approved by the second participant. Additional guidelines include, but are not limited to, the following: (i) file size guidelines, where only files above or below a certain size are permitted; (ii) security guidelines, where only files that meet certain security requirements are permitted; and/or (iii) network bandwidth guidelines, where the connection bandwidth between a requesting device and a storing device must be above or below a certain amount.

In the event the file stored in cache does meet guidelines ("yes" branch, 216), the method may send the file to the requesting participant (218). In the event the file stored in cache does not meet guidelines ("no" branch, 216), the method may query (208) an external device for the requested file. Subsequently, the method may perform steps 210 through 214 as previously discussed to fulfill the request received from the participant.

The method may continue by sending (218) the file to the requesting participant. In this embodiment, collaboration program 112 sends the file to the requesting participant from the collaboration cache on which the file is stored. In one example, a participant with client device 104C requests a file and collaboration program 112 determines the file is stored in collaboration cache 114 and meets the guidelines. Collaboration program 112 can send the file from collaboration cache 114 to client device 104C, where the user can select whether or not store the file in collaborative cache 116C on client device 104C. In another example, a participant with client device 104C requests a file and collaboration program 112 determines the file is stored in collaboration cache 116A on client device 104A. Collaboration program 112 can instruct client device 104A to send the file to client device 104C via internal network 106. In yet another example, a participant with client device 104C requests a file and collaboration program 112 determines the file is stored in portions, where a first portion of the file is stored in collaboration cache 116A and a second portion of the file is stored in collaboration cache 116B. Collaboration program 112 can send the first portion and the second portion of the file from collaboration cache 116A and 116B, respectively, to client device 104C.

Figure 3:
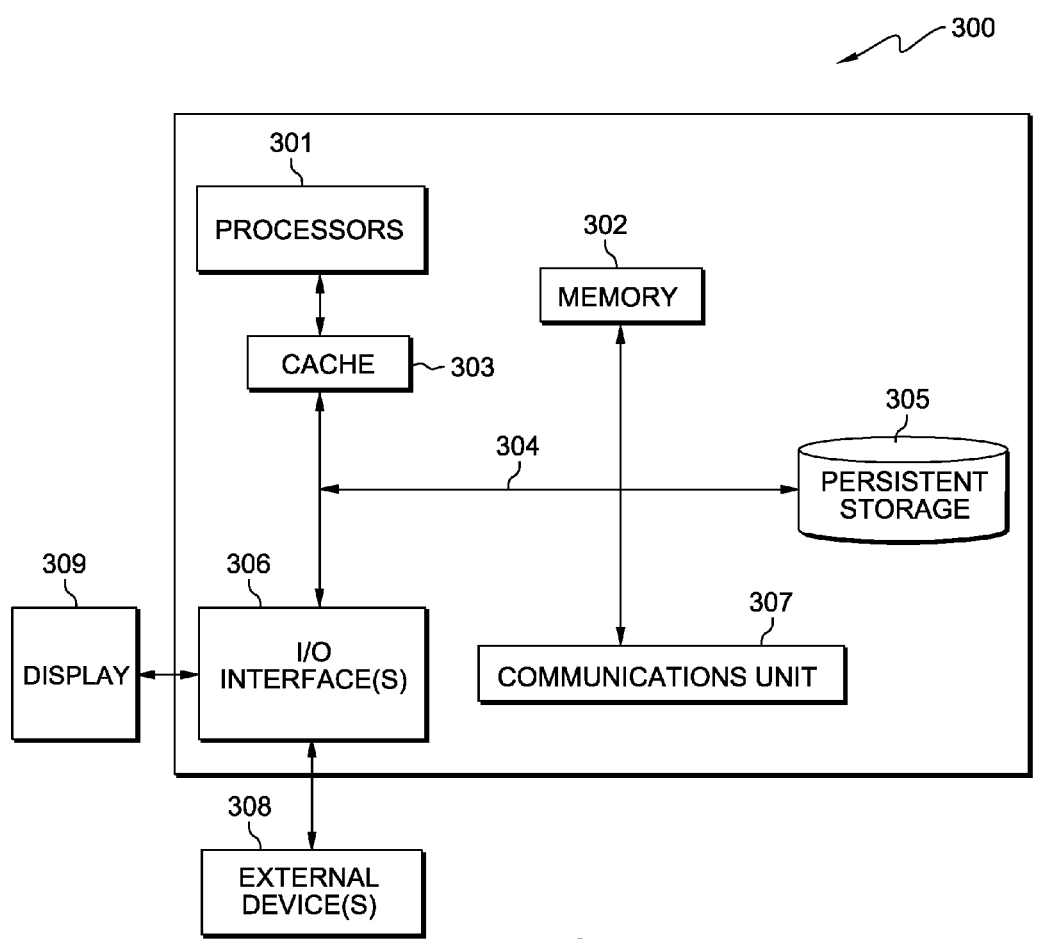
FIG. 3 is a block diagram of components of a computer system, such as the computer server of FIG. 1, in an embodiment in accordance with the present invention.

FIG. 3 depicts computer system 300, where server computer 102 is an example of a system that includes collaboration program 112. The computer system includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method for collaborative caching of files during a collaboration session, the method comprising:
responsive to receiving a request from a first electronic device for a first file, determining, by one or more processors, whether the first file is stored in one or more caches, wherein the one or more caches are associated with one or more electronic devices;

responsive to determining a first portion of the first file is stored in a cache of a second electronic device and a second portion of the first file is stored in a cache of a third electronic device, determining, by one or more processors, whether the first portion and the second portion of the first file meet a set of guidelines, wherein the set of guidelines include a duration of time for which the first portion was stored in the cache of the second electronic device, a duration of time for which the second portion was stored in the cache of the third electronic device, and a plurality of security requirements for the second electronic device and the third electronic device;

responsive to determining the first portion and the second portion of the first file meet the set of guidelines, sending, by one or more processors, the first portion of the first file from the cache of the second electronic device and the second portion of the first file from the cache of the third electronic device via an internal network to the first electronic device;

responsive to receiving a request from the first electronic device for a second file, determining, by one or more processors, whether the second file is stored in the one or more caches associated with the one or more electronic devices;

responsive to determining the second file is not stored in the one or more caches, querying, by one or more processors, an external electronic device through an external network for the second file; and responsive to receiving the second file from the external electronic device, storing, by one or more processors, a first portion of the second file in a cache of the first electronic device and a second portion of the second file in the cache of the second electronic device.

2. The method of claim 1, wherein the set of guidelines include a defined duration of time for storing the first file.

3. The method of claim 1, wherein the first electronic device is associated with a first participant of a collaboration session and the second electronic device is associated with a second participant of the collaboration session.

4. The method of claim 1, wherein the set of guidelines includes at least a duration the first file has been stored in the cache of the second electronic device and a type of device for the second electronic device.

5. A computer program product for collaborative caching of files during a collaboration session, the computer program product comprising:

one or more computer readable tangible storage media and program instructions stored on at least one of the one or more storage media, the program instructions comprising:

program instructions to, responsive to receiving a request from a first electronic device for first file, determine whether the first file is stored in one or more caches, wherein the one or more caches are associated with one or more electronic devices;

program instructions to, responsive to determining a first portion of the first file is stored in a cache of a second electronic device and a second portion of the first file is stored in a cache of a third electronic device, determine whether the first portion and the second portion of the first file meet a set of guidelines, wherein the set of guidelines include a duration of time for which the first portion was stored in the cache of the second electronic device, a duration of time for which the second portion was stored in the cache of the third electronic device, and a plurality of security requirements for the second electronic device and the third electronic device;

program instructions to, responsive to determining the first portion and the second portion of the first file meet the set of guidelines, send the first portion of the first file from the cache of the second electronic device and the second portion of the first file from the cache of the third electronic device via an internal network to the first electronic device;

program instructions to, responsive to receiving a request from the first electronic device for a second file, determine whether the second file is stored in the one or more caches associated with one or more electronic devices;

program instructions to, responsive to determining the second file is not stored in the one or more caches, query an external electronic device through an external network for the second file; and program instructions to, responsive to receiving the second file from the external electronic device, store a first portion of the second file in a cache of the first electronic device and a second portion of the second file in the cache of the second electronic device.

6. The computer program product of claim 5, wherein the set of guidelines include a defined duration of time for storing the first file.

7. The computer program product of claim 5, wherein the first electronic device is associated with a first participant of a collaboration session and the second electronic device is associated with a second participant of the collaboration session.

8. The computer program product of claim 5, wherein the set of guidelines includes at least a duration a file has been stored in the cache of the second electronic device and a type of device for the second electronic device.

9. A computer system for collaborative caching of files during a collaboration session, the computer system comprising:

one or more computer processors;
one or more computer readable storage media; and
program instructions stored on the computer readable storage media for execution by at least one of the one or more computer processors, the program instructions comprising:

program instructions to, responsive to receiving a request from a first electronic device for first file, determine whether the first file is stored in one or more caches, wherein the one or more caches are associated with one or more electronic devices;

program instructions to, responsive to determining a first portion of the first file is stored in a cache of a second electronic device and a second portion of the first file is stored in a cache of a third electronic device, determine whether the first portion and the second portion of the first file meet a set of guidelines, wherein the set of guidelines include a duration of time for which the first portion was stored in the cache of the second electronic device, a duration of time for which the second portion was stored in the cache of the third electronic device, and a plurality of security requirements for the second electronic device and the third electronic device;

program instructions to, responsive to determining the first portion and the second portion of the first file meet the set of guidelines, send the first portion of the first file from the cache of the second electronic device and the second portion of the first file from the cache of the third electronic device via an internal network to the first electronic device;

program instructions to, responsive to receiving a request from the first electronic device for a second file, determine whether the second file is stored in the one or more caches associated with one or more electronic devices;

program instructions to, responsive to determining the second file is not stored in the one or more caches, query an external electronic device through an external network for the second file; and program instructions to, responsive to receiving the second file from the external electronic device, store a first portion of the second file in a cache of the first electronic device and a second portion of the second file in the cache of the second electronic device.

10. The computer system of claim 9, wherein the set of guidelines include a defined duration of time for storing the first file.

11. The computer system of claim 9, wherein the first electronic device is associated with a first participant of a collaboration session and the second electronic device is associated with a second participant of the collaboration session.

12. The computer system of claim 9, wherein the set of guidelines includes at least a duration a file has been stored in the cache of the second electronic device and a type of device for the second electronic device.

\* \* \* \* \*